(12) United States Patent
Suthar et al.

(10) Patent No.: US 9,298,795 B2
(45) Date of Patent: Mar. 29, 2016

(54) SYNCHRONIZATION ADAPTER FOR SYNCHRONIZING DATA TO APPLICATIONS THAT DO NOT DIRECTLY SUPPORT SYNCHRONIZATION

(71) Applicant: Microsoft Technology Licensing, LLC, Redmond, WA (US)

(72) Inventors: Paresh Suthar, Redmond, WA (US); Jack Ozzie, Redmond, WA (US); Steven Lees, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 422 days.

(21) Appl. No.: 13/652,589

(22) Filed: Oct. 16, 2012

(65) Prior Publication Data

US 2013/0041867 A1 Feb. 14, 2013

Related U.S. Application Data

(63) Continuation of application No. 12/141,946, filed on Jun. 19, 2008, now Pat. No. 8,315,978.

(51) Int. Cl.
*G06F 17/00* (2006.01)
*G06F 17/30* (2006.01)

(52) U.S. Cl.
CPC .................. *G06F 17/30578* (2013.01)

(58) Field of Classification Search
CPC .............................. G06F 11/1662; G06F 17/30
USPC ............................................ 707/60–899, 610
See application file for complete search history.

(56) References Cited

U.S. PATENT DOCUMENTS

| | | |
|---|---|---|
| 6,769,048 B2 | 7/2004 | Goldberg et al. |
| 7,484,219 B2 | 1/2009 | Mitra |
| 7,804,838 B2 | 9/2010 | Dumet et al. |

(Continued)

OTHER PUBLICATIONS

"FeedSync Design Principles", http://blogs.msdn.com/stevenlees/archive/2007/12/07/feedsync-design-principles.aspx. Dec. 7, 2007, 2 pgs.

(Continued)

*Primary Examiner* — Isaac M Woo
(74) *Attorney, Agent, or Firm* — Micah Goldsmith; Judy Yee; Micky Minhas

(57) ABSTRACT

A synchronization adapter is coupled to the application that does not support synchronization and generates the necessary synchronization metadata for all data in the application that is to be synchronized. The synchronization adapter then combines the metadata to the actual data to be synchronized to form a synchronization feed. The synchronization feed is stored in an internal cache (or data store) which is internal to the application, or an external cache (or data store), which is external to the application, or it can be stored in both caches. The synchronization adapter also intermittently determines whether the application data has changed, thus warranting a change in its metadata, or whether a synchronization operation is warranted to synchronization operation is warranted to synchronize the data with data in another application. In either case, the synchronization adapter makes the changes to the data, or performs a synchronization operation.

20 Claims, 4 Drawing Sheets

(56) References Cited

U.S. PATENT DOCUMENTS

| | | |
|---|---|---|
| 8,315,978 B2 | 11/2012 | Suthar et al. |
| 2003/0014483 A1* | 1/2003 | Stevenson et al. ............ 709/203 |
| 2003/0018719 A1* | 1/2003 | Ruths et al. .................. 709/205 |
| 2003/0028683 A1 | 2/2003 | Yorke et al. |
| 2005/0027755 A1 | 2/2005 | Shah et al. |
| 2005/0228812 A1 | 10/2005 | Hansmann et al. |
| 2006/0074996 A1 | 4/2006 | Corbett et al. |
| 2006/0184617 A1* | 8/2006 | Nicholas et al. ............. 709/203 |
| 2006/0259523 A1 | 11/2006 | Wallis et al. |
| 2007/0038712 A1 | 2/2007 | Affronti et al. |
| 2007/0124336 A1 | 5/2007 | Arellano |
| 2007/0180194 A1 | 8/2007 | Graham et al. |
| 2007/0226312 A1 | 9/2007 | Stirbu et al. |
| 2007/0244901 A1* | 10/2007 | Mohler et al. .................. 707/10 |
| 2007/0276836 A1 | 11/2007 | Chatterjee et al. |
| 2007/0294366 A1 | 12/2007 | Ozzie et al. |
| 2008/0046471 A1* | 2/2008 | Moore et al. ............... 707/104.1 |
| 2008/0155430 A1* | 6/2008 | Prager et al. .................. 715/751 |

OTHER PUBLICATIONS

"FeedSync", http://channel9.msdn.com/ShowPost.aspx?PostID=363402, 1 pg.

"Open Source Implementation of Simple Sharing Extensions (SSE)" http://www.clariusconsulting.net/blogs/kzu/archive/2007/06/26/28072.aspx, Jun. 26, 2007, 3 pgs.

Official Action dated Mar. 30, 2011 in related U.S. Appl. No. 12/141,946, filed Jun. 19, 2008, 19 pgs.

Final Office Action dated Nov. 3, 2011, in related U.S. Appl. No. 12/141,946, filed Jun. 19, 2008, 23 pgs.

Notice of Allowance dated Jul. 16, 2012, in related U.S. Appl. No. 12/141,946, filed Jun. 19, 2008, 11 pgs.

Prosecution History from U.S. Appl. No. 12/141,946 including: Issue Notification dated Oct. 31, 2012, Amendment with RCE dated Feb. 1, 2012, Amendment dated Jul. 28, 2011, and Application and drawings filed Jun. 19, 2008, 56 pages.

\* cited by examiner

SYNCHRONIZATION ADAPTER FOR SYNCHRONIZING DATA TO APPLICATIONS THAT DO NOT DIRECTLY SUPPORT SYNCHRONIZATION

CROSS-REFERENCE TO RELATED APPLICATION

The present application is a continuation of and claims priority of U.S. patent application Ser. No. 12/141,946, filed Jun. 19, 2008, the content of which is hereby incorporated by reference in its entirety.

BACKGROUND

Synchronization of data between applications has been performed in the past. A number of difficulties must be addressed in performing such synchronization. For instance, the data formats of different applications may be different. Similarly, applications reside on systems that have different types of connections to a network. The particular idiosyncrasies of a given data format, or a given network, can be impediments to generating a general synchronization system that operates across various networks with various applications.

In order to address these difficulties, a number of different types of synchronization systems are currently in use. The first is a customized system, in which a solution-specific synchronization algorithm is developed that takes into account all of the various particularities of the applications being synchronized, and the network over which the data is set for synchronization. These types of customized synchronization systems are often solution-specific and are tightly coupled to the individual applications and data formats being synchronized, and to the particular network characteristics over which the data is transmitted.

A second type of system currently in use for synchronizing data uses a family of web feed formats that are used to publish frequently updated content, such as web blog entries, news headlines, pod casts, etc. This family of web feed formats is referred to as "Really Simple Syndication" (RSS) formats. Such synchronization systems also use another similar set of formats referred to as the "ATOM feed formats".

Data that can be transmitted using RSS or ATOM feed formats is typically transmitted when a user subscribes to a given feed. A synchronization reader on the user's system checks a user's subscribed links for new content and downloads any updates to the content desired by the reader.

The discussion above is merely provided for general background information and is not intended to be used as an aid in determining the scope of the claimed subject matter.

SUMMARY

Simple sharing extensions (also sometimes referred to as FeedSync) are extensions to RSS and ATOM feed formats that enable the aggregation of information by using a variety of data sources. These extensions provide a way to synchronize data across a mesh of end points using RSS or ATOM feed mechanism (data format and algorithm).

It is also desirable, however, to synchronize data from applications that do not support such extensions. That is, many applications were designed without any thought given to synchronization, and they do not natively support any synchronization format. Yet, it may be desirable to synchronize data from such applications.

Therefore, a synchronization adapter is coupled to the application that does not support synchronization and generates the necessary synchronization metadata for all data in the application that is to be synchronized. The synchronization adapter then combines the metadata to the actual data to be synchronized to form a synchronization feed. The synchronization feed is stored in an internal cache (or data store) which is internal to the application, or an external cache (or data store), which is external to the application, or it can be stored in both caches. The synchronization adapter also intermittently determines whether the application data has changed, thus warranting a change in its metadata, or whether a synchronization operation is warranted to synchronization operation is warranted to synchronize the data with data in another application. In either case, the synchronization adapter makes the changes to the data, or performs a synchronization operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
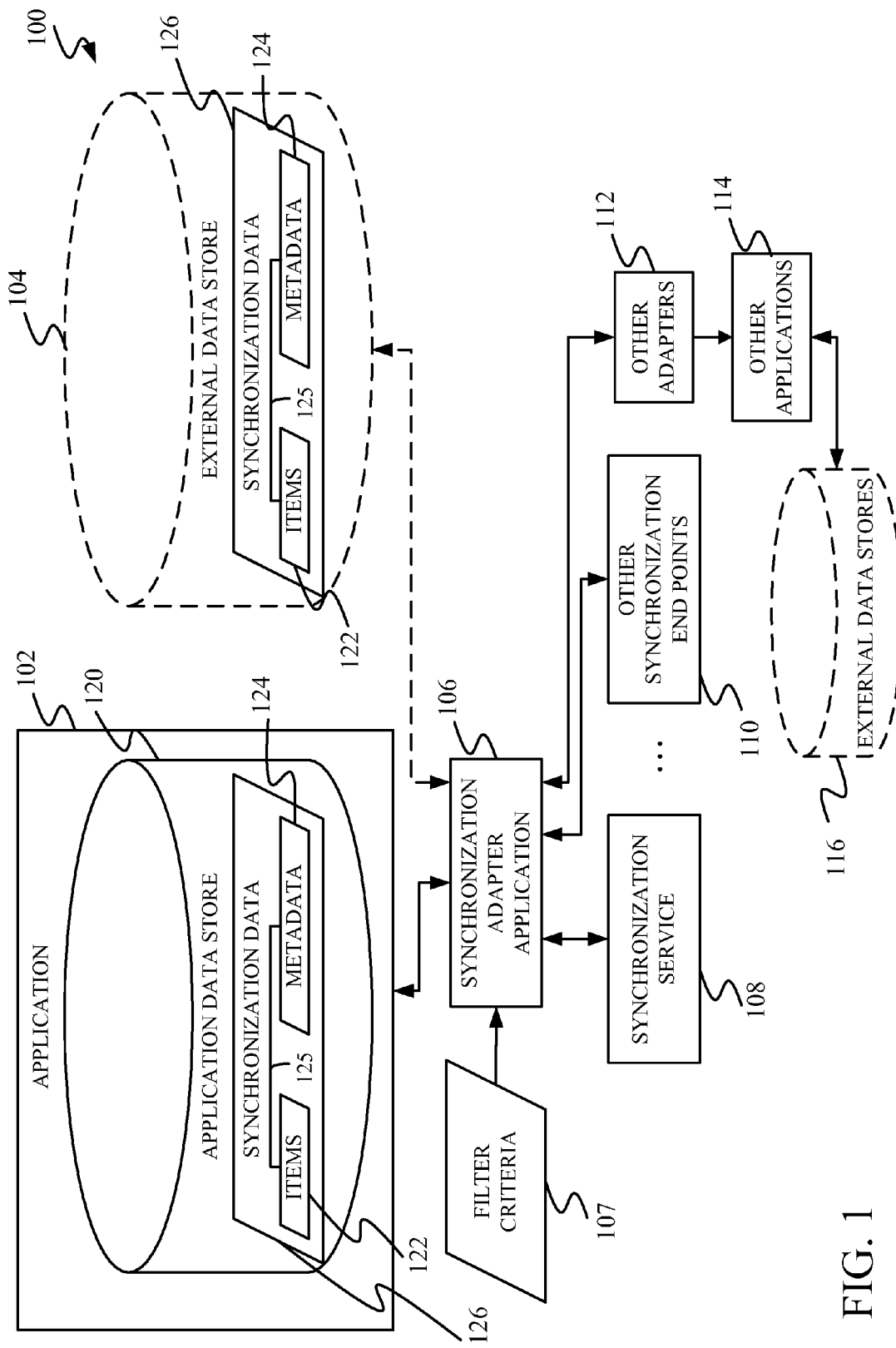
FIG. 1 is a block diagram of one illustrative synchronization system.

FIG. 1 is a block diagram of one illustrative synchronization system 100. System 100 includes application 102, optional external data store 104, synchronization adapter application 106, synchronization service 108, other synchronization end points 110, other adapters 112, and other applications 114. System 100 also shows that external data stores 116 can be associated with other applications 114. In one exemplary embodiment, the links between synchronization adapter application 106 and service 108, end points 110, and adapters 112, are implemented using hypertext transfer protocol (HTPP).

In the embodiment shown in FIG. 1, application 102 and other applications 114 do not natively support synchronization using known web feed formats (such as RSS and ATOM feed formats). In other words, applications 102 and 114 do not generate the metadata necessary to synchronize application data using those formats.

In the embodiment shown in FIG. 1, however, synchronization adapter application 106 and other adapters 112 are provided. Adapters 106 and 112 are used to generate the necessary metadata for the data in applications 102 and 114 so that they can be synchronized using web feed formats.

System 100 also shows that external data stores 116 can be associated with other applications 114.

Figure 2:
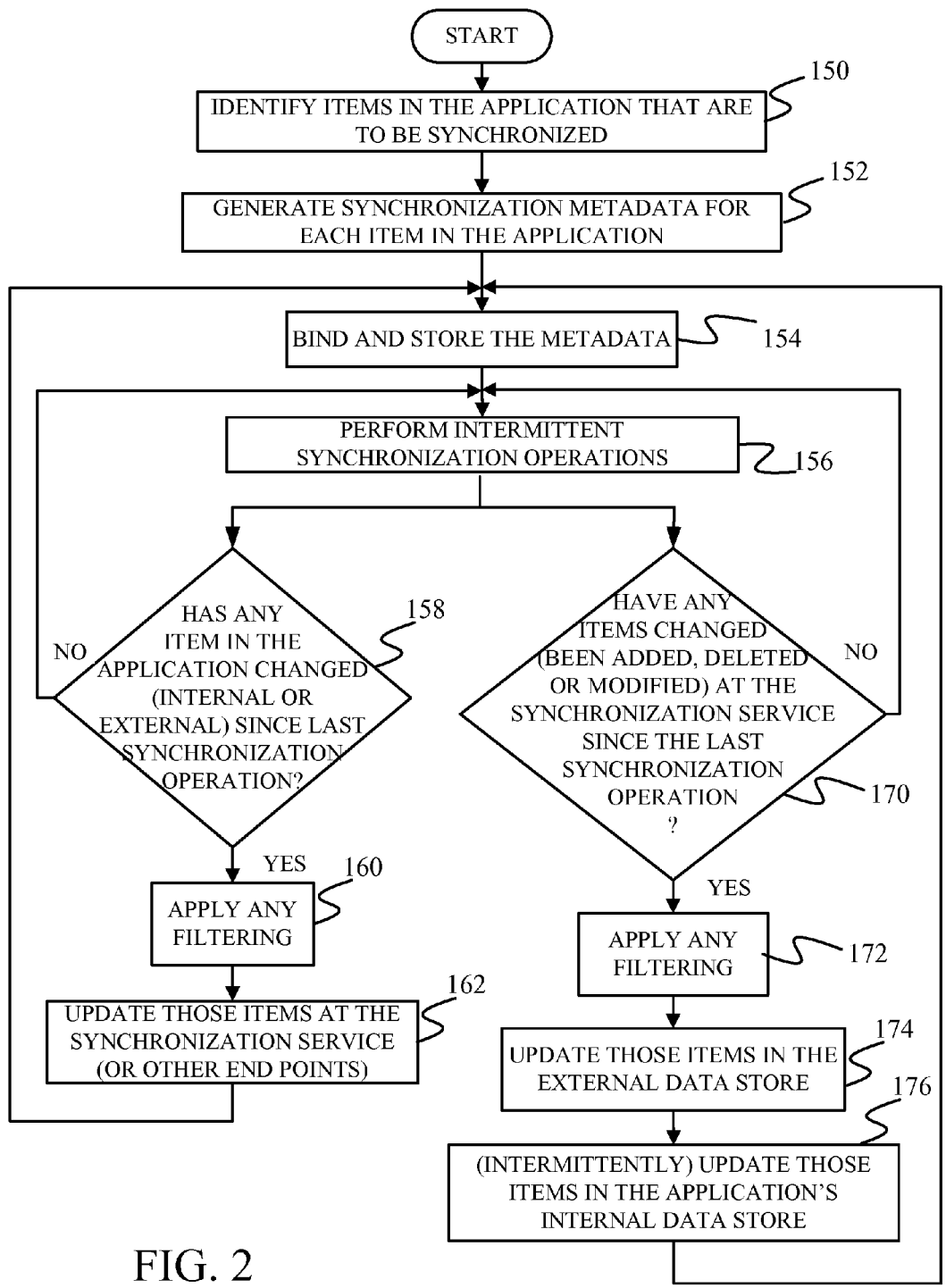
FIG. 2 is a flow diagram illustrating one embodiment of the overall operation of the system shown in FIG. 1.

FIG. 2 is a flow diagram illustrating one embodiment of the overall operation of system 100, shown in FIG. 1. Each application that has information to be synchronized illustratively includes its own application data store 120. Application data store 120 includes items 122 to be synchronized. In one embodiment, an item 122 might be a row or a column in a database, or a list item in a list application. Of course, items 122 can be of any granularity. For instance, they may include fields, data types, features of a table, collections, etc. Application 102 in the embodiment shown in FIG. 1 has items 122 that are to be synchronized with other end points. Identifying the items in the application that are to be synchronized is indicated by block 150 in FIG. 2.

Once all of the items 122 to be synchronized are identified, synchronization adapter application 106 takes all instances of those items and creates synchronization content (synchronization metadata) for each instance of the items, and then stores the metadata 124 at a desired location and binds the instances of items 122 to the associated metadata 124 to generate a synchronization feed.

Binding the individual item 122 of data to its associated synchronization metadata 124 to form a synchronization feed 125 can occur in any desired way. For instance, the generated metadata 124 can simply include a pointer or reference to a location of the actual data item to which it is bound. Other ways of binding the data can be used as well. Generating synchronization metadata for each item in the application is indicated by block 152 in FIG. 2, and binding and storing the metadata is indicated by block 154.

In one embodiment, the metadata 124 is stored along with associated items 122, as synchronization data 126, in the application data store 120 of the application 102. This can be done, for instance, where application 102 has an extensible data store such that the metadata 124 can be added to it. In another embodiment, external data store 104 is provided, and items 122 and metadata 124 are provided as synchronization data 126 that is stored in the external data store 104. This may be done in embodiments where the application data store 120 in application 102 is not an extensible data store. In addition, even where data store 120 is extensible, if it is computationally expensive to access the application's internal data store 120, then an embodiment is provided in which synchronization data 126 is stored in both the application's internal data store 120, and in external data store 104. Of course, it may be that only the metadata is stored in the external data store 104, so long as it is bound, in some way, to the actual data in application data store 120. In this way, communication between adapter 106 and the other end points (service 108, synchronization end points 110, other adapters 112) is isolated from communication between application 102 and synchronization adapter 106.

Once the metadata 124 has been generated for each of the instances of items 122 to be synchronized, adapter 106 intermittently performs synchronization operations with the other end points 108-112, with which application 102 is to be synchronized. This is indicated by block 156 in FIG. 2.

In doing so, synchronization adapter 106 determines not only whether synchronization data 126 has changed for application 102, but it also determines whether any other data has changed from end points 108-112 which needs to be synchronized to application 102. These two operations can be performed in series, or in parallel. FIG. 2 shows them performed in parallel, but this is only one embodiment.

Therefore, the present discussion first proceeds with respect to adapter 106 determining whether synchronization data 126 for application 102 has changed. This is indicated by block 158 in FIG. 2. Adapter 106 determines whether the actual data items have been deleted or modified, or whether new actual data items have been added in application 102. This operation can be performed synchronously, or asynchronously. In other words, adapter 106 can check to see whether the data has changed periodically (after a certain amount of time has passed) or based upon the occurrence of another event that triggers adapter 106 to publish data to the end points 108-112 for synchronization, or synchronize data published from the other end points 108-112.

In any case, adapter 106 determines whether the data has changed. This can also be done using a variety of different techniques. For instance, the data can be associated with a value that is ever incrementing as information is changed. With every change (with every addition, modification, or deletion) the value is incremented. If the count value is different from its value during the last synchronization operation, then adapter 106 can perform another synchronization operation. It should also be noted that the count value can be associated with any granularity. In other words, each item to be synchronized can be associated with a count value or a collection or group of items to be synchronized can be associated with a count value, or the count value can be associated with a given application 102.

Similarly, a time stamp can be used. The time stamp can be placed on each item of data when it was last changed. If the time stamp exceeds the time of the last synchronization operation, then the data has been changed since then and is to be synchronized again.

If no data has been changed, then processing continues at block 156 where adapter 106 simply waits to perform the operation again.

However, if at block 158, it is determined that some data to be synchronized has been changed, then adapter 106 can optionally apply filters to the data. This is indicated by block 160 in FIG. 2. In applying a filter, adapter 106 can use any desired filter criteria 107. The filter criteria 107 can be specific to application 102, or general. For instance, the data to be synchronized can be filtered based on the author of the data, a publication flag which can be set, or content of the data. Similarly, where data to be synchronized is received from other end points 108-112, it can be filtered based on user parameters, or human input can be required before synchronization. In other words, a user interface can be displayed which allows a user to either accept or reject a synchronization. Therefore, the user can be directly involved in the synchronization process, as desired.

After the filters have been applied at block 160, and if there is still data to be synchronized, then adapter 106 updates those items 122 in application 102 that have changed. This information can then be published by adapter 106 for synchronization at synchronization service 108, or other end points 110-112. This is indicated by block 162 in FIG. 2.

One particular embodiment for changing or updating the items for publication to the synchronization service or other end points will be described in greater detail below with respect to FIG. 3.

Once the updates or synchronizations have been performed, processing again reverts to block 154 in which any new metadata generated during the update or synchronization process is bound to its data item to form a synchronization feed and stored in the data store.

The discussion now proceeds with respect to the synchronization operation performed for changes to items in one of the end points 108-112. The discussion will proceed specifically with respect to changes made to items to be synchronized at synchronization service 108. However, the same process will illustratively be performed with respect to any other end points 110-112.

First, adapter 106 determines whether synchronization service 108 has any data which has changed since the last synchronization operation with service 108. This is indicated by block 170 in FIG. 2. Again, in determining this, adapter 106 determines whether any instances of data items 122 have been added, deleted, or modified. If so, then adapter 106 again applies any filters using filter criteria 107. This is indicated by block 172 in FIG. 2.

Once the filters have been applied, adapter 106 updates those items in external data store 104 that need to be updated, as well as those items in internal data store 102. This is indicated by blocks 174 and 176 in FIG. 2, respectively. It should be noted, of course, that where accessing the internal data store 120 of application 102 is computationally expensive, it can be performed less often than updating external data store 104.

Once the data received from one of the end points 108-112 has been synchronized to application 102, processing again continues with respect to block 154 in which any new metadata generated for the items 122 synchronized from the end points 108-112 is bound to those items and stored in the appropriate data store 120 or 104, or both.

Figure 3:
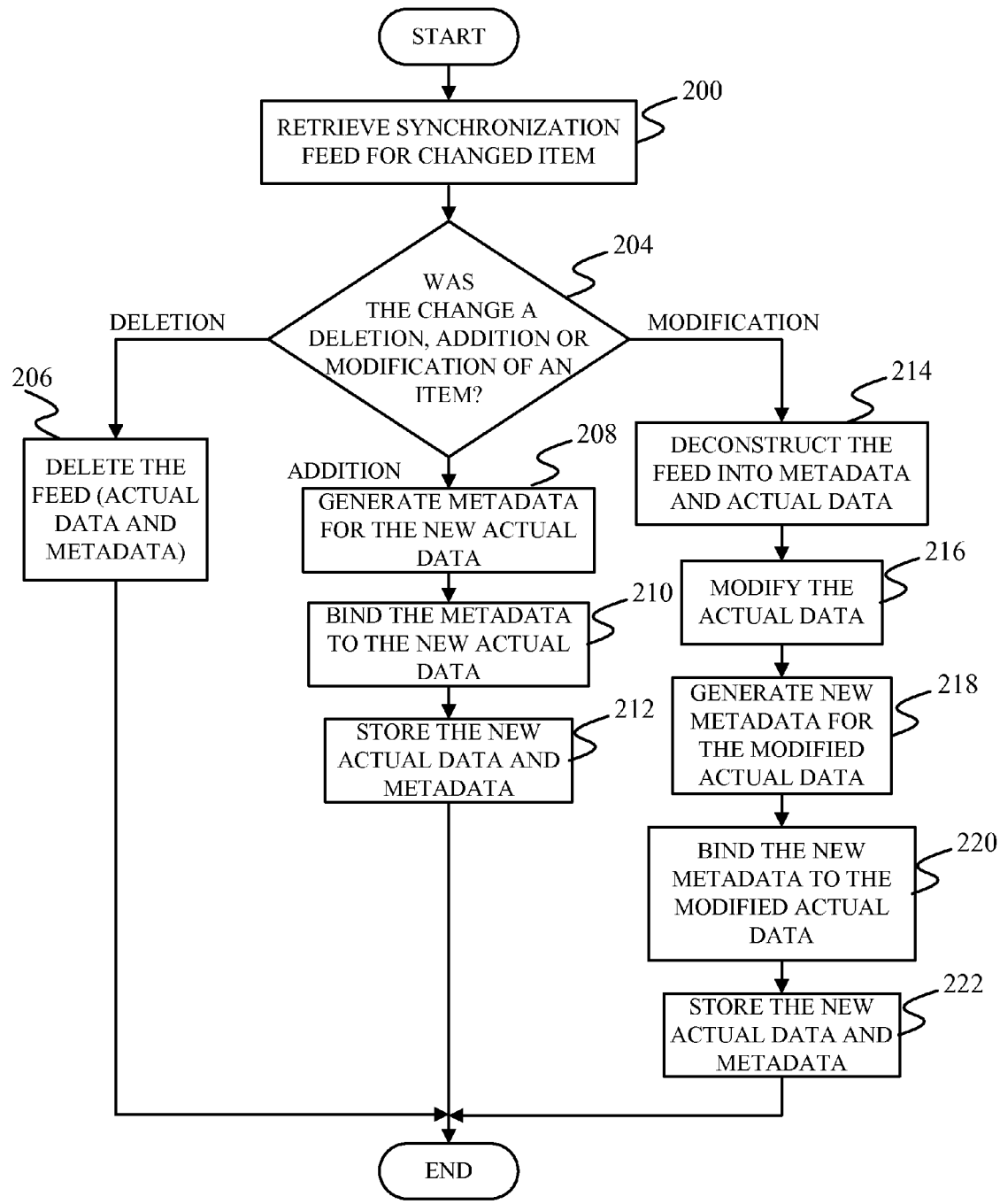
FIG. 3 is a flow diagram illustrating one illustrative embodiment of processing data when a change is detected.

FIG. 3 is a flow diagram showing, in more detail, one illustrative embodiment of the operation of adapter 106 in updating items 122 that need to be synchronized. Adapter 106 first determines that an item 122 must be updated, either because it was changed by application 102, or because it was modified by one of the other end points 108-112 with which application 102 is to be synchronized. Adapter 106 then retrieves the synchronization feed (the actual instance of data item 122 that has been changed, along with its metadata 124). This is indicated by block 200 in FIG. 3.

Adapter 106 then determines whether the item to be changed has been deleted, added, or modified. This is indicated by block 204 in FIG. 3.

If the item has been deleted, then the adapter 106 indicates this in a desired way. For instance, deletion of items may be represented by "tombstones" even though the data may not be removed simply from the data stores 120, 104, or both. This is indicated by block 206 in FIG. 3.

If a new instance of an item 122 has been added, then adapter 106 generates the metadata for the new actual data item that has been added. It should be noted that, in one embodiment, the metadata is generated by the endpoint that created, updated or deleted the data. The other endpoints that incorporate the data item reuse the same metadata. The metadata will illustratively include an identifier that identifies the item of actual data to which the metadata is bound. The metadata can then include any other desired metadata, such as the history of this item of data (when it was created, when it was last modified and stored, etc.). The metadata may also include, for example, an attribute that defines a range of data contained in a collection. For instance, if an item of data belongs to a collection, it may be desirable to have the entire collection synchronized when any item in the collection has been modified. Therefore, this can be indicated in the metadata for that item as well. Other items of metadata can be generated, as desired. Generating the metadata 124 for the new actual data item 122 is indicated by block 208 in FIG. 3.

Once the metadata 124 has been generated, it is bound to the new actual data item 122. This may be done simply by placing the identifier in the metadata 124, which identifies the new data items 122 to which the metadata 124 belongs. Binding the metadata 124 to the new actual data 122 is indicated by block 210 in FIG. 3.

Finally, adapter 106 stores the new actual data item 122 and its metadata 124 in its appropriate data store. This is indicated by block 212 in FIG. 3.

If, at block 204, an instance of a data item 122 to be synchronized has been modified, then adapter 106 deconstructs the feed of that data item 122 into the individual metadata 124 and actual data 122 components. This is indicated by block 214 in FIG. 3. Adapter 106 then modifies the actual data item in accordance with the detected modification. This is indicated by block 216 in FIG. 3. Adapter 106 then generates new metadata for the modified actual data. In other words, it may be that the metadata 124 is based on the content of the actual data item 122. Therefore, when the actual data item 122 is revised or modified, the value of the metadata 124 (or part of the metadata) may be revised as well. Generating this new metadata 124 is indicated by block 218 in FIG. 8. Again, the new metadata is bound to the modified actual data, as indicated by block 220, and the new metadata and actual data are stored in the appropriate data store, as indicated by block 222. It will again be noted, of course, that if both data stores 120 and 104 are used, and accessing the internal data store 120 of application 102 is computationally expensive, then modifying data in that data store may be delayed until multiple modifications are needed, or as otherwise desired.

It will also be appreciated that the actual data item 122 in application 102 that is to be synchronized may, itself, be a reference to some external data or a file which is found elsewhere. When adapter 106 processes modifications to this data item 122, it augments or otherwise modifies the data referred to, as is required by the modification.

It should also be noted that, where adapter 106 is publishing data to end points 108-112 which require the data in a different form, adapter 106 can implement data transformations to make the data being published acceptable to the target system. For instance, if a target system (such as end point 108-112) only accepts modifications in a certain format, then even though those modifications are made in a different format by application 102, modifications can be transformed into the desired format of the target end point 108-112, by adapter 106. This can be performed regardless of whether the data item 122 being synchronized refers to an external file, or contains the actual data, itself.

Figure 4:
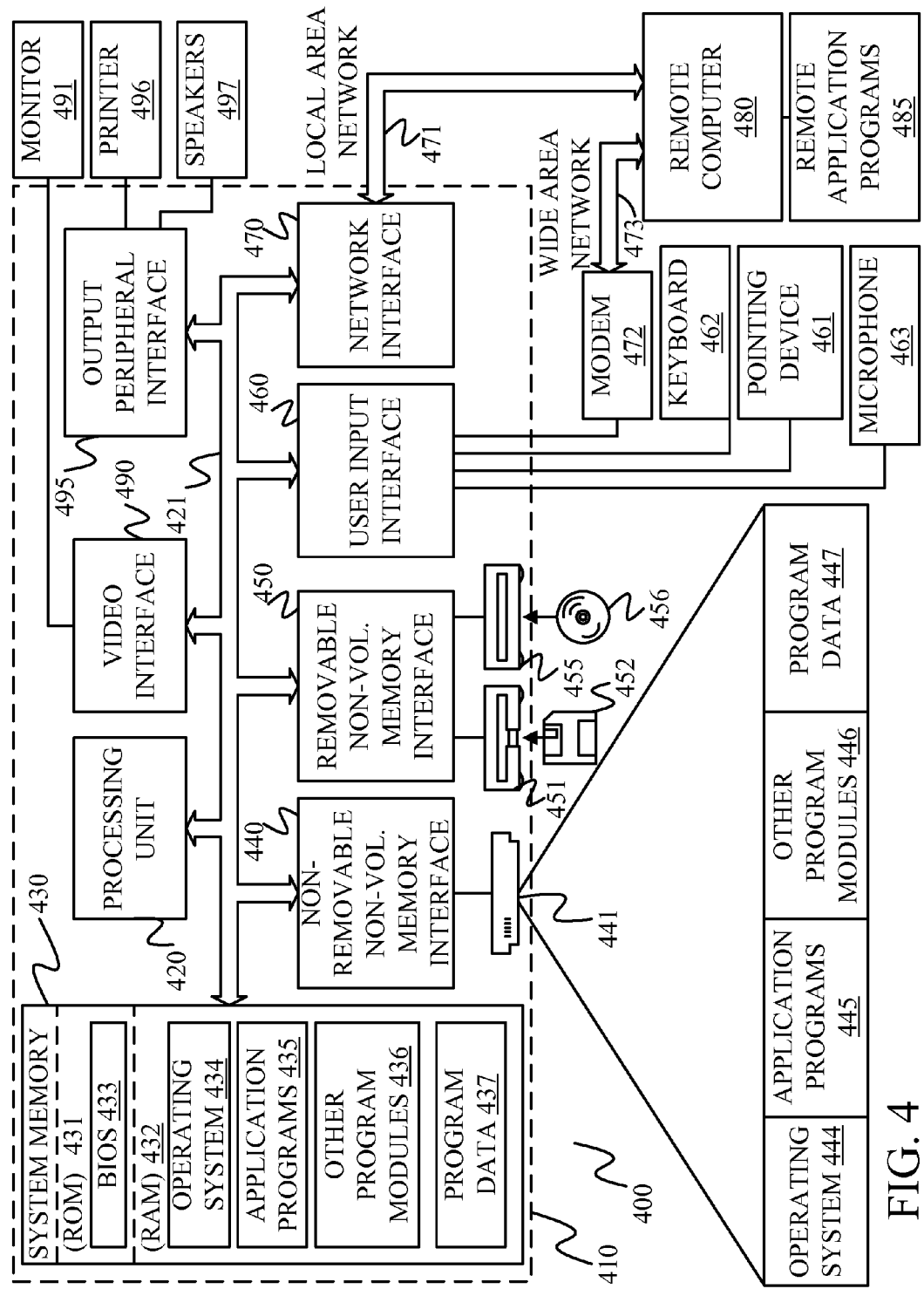
FIG. 4 is a block diagram of one illustrative computing environment.

FIG. 4 illustrates an example of a suitable computing system environment 400 on which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. System 100 can be stored in modules 446, programs 445 or elsewhere, including remotely.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A synchronization endpoint system, comprising:
a first synchronization component that receives a synchronization feed that includes a data item of an application and synchronization metadata that is separate from the data item, the synchronization metadata having a synchronization metadata format and defines how to synchronize the data item in accordance with a synchronization protocol, wherein the synchronization metadata is derived from and associated with the data item of the application, and wherein the application does not support the synchronization metadata format; and
a second synchronization component that receives the synchronization feed, supports the synchronization metadata format, and incorporates the data item and the associated synchronization metadata into an application function of the synchronization endpoint system.

2. The system of claim 1, wherein the synchronization feed is a modified synchronization feed.

3. The system of claim 1, wherein the synchronization metadata is modified synchronization metadata.

4. The system of claim 1, wherein the second synchronization component utilizes the synchronization metadata to selectively synchronize the data item based on a data change determination.

5. The system of claim 1, wherein the second synchronization component utilizes the synchronization metadata to selectively synchronize the data item based on a determination related to an amount of time that has passed since a previous synchronization operation.

6. A computer-implemented synchronization adapter, comprising a metadata generator that receives an indication of an item in an application that is to be synchronized to one or more of a plurality of other applications, wherein the metadata generator also generates synchronization metadata for the item in the application, the synchronization metadata enabling synchronization of the item in accordance with a synchronization protocol, and the synchronization metadata having a format that is not supported by the application.

7. The adapter of claim 6, wherein the adapter includes a synchronization component that utilizes the synchronization metadata to synchronize the item with one or more of the plurality of other applications.

8. The adapter of claim 6, wherein the adapter includes a synchronization component that utilizes the synchronization metadata to synchronize a data item related to but different than said item with one or more of the plurality of other applications.

9. The adapter of claim 6, wherein the adapter includes a filtering component that applies a filter to said item and, based on the application of the filter, selectively synchronizes the item with one or more of the plurality of other applications.

10. The adapter of claim 6, wherein the adapter stores the synchronization metadata in a data store internal to the first application.

11. The adapter of claim 6, wherein the adapter stores the synchronization metadata in a data store external to the first application.

12. The adapter of claim 6, wherein the adapter is associated with a change detector that determines that the item has changed, and wherein the adapter responds to the determination by utilizing the synchronization metadata to synchronize the item as changed with one or more of the plurality of other applications.

13. The adapter of claim 6, wherein the adapter includes a synchronization component that utilizes the synchronization metadata to synchronize the item with a synchronization endpoint.

14. The adapter of claim 6, wherein the adapter utilizes the synchronization metadata to selectively synchronize the item based on a data change determination.

15. The adapter of claim 6, wherein the adapter utilizes the synchronization metadata to selectively synchronize the item based on a determination related to an amount of time that has passed since a previous synchronization operation.

16. A method of synchronizing data, comprising:
receiving, at a synchronization adapter from a first application, a plurality of data items to be synchronized with one or more other applications;
generating, with the synchronization adapter, synchronization metadata for each of the plurality of data items to be synchronized, the synchronization metadata having a format that is not supported by the first application;
binding the synchronization metadata to corresponding data items to form a plurality of synchronization feeds, each synchronization feed comprising a given one of the data items and the synchronization metadata generated for the given data item;
receiving an indication that a particular data item in the plurality of data items has changed since a last synchronization operation;
deconstructing the synchronization feed into the particular data item and the corresponding synchronization metadata;
modifying the particular data item based on the change in the particular data item;
generating any modified synchronization metadata based on the change in the particular data item;
binding the modified data item to the modified synchronization metadata to obtain a modified synchronization feed; and
publishing the modified synchronization feed.

17. The method of claim 16, comprising receiving a synchronization teed reflecting that the particular data item has changed.

18. The method of claim 16, further comprising intermittently receiving a plurality of different synchronization feeds representing data changes.

19. The method of claim 16, wherein generating synchronization metadata for each of the plurality of data items to be synchronized comprises:
generating synchronization metadata that is separate from the data item, the synchronization metadata having a synchronization metadata format and defines how to synchronize the data item in accordance with a synchronization protocol.

20. The method of claim 16, wherein receiving an indication comprises applying a filter to the particular data item to selectively synchronize the particular data item with the one or more other applications.

* * * * *